US010295065B2

(12) United States Patent
Le Gonidec et al.

(10) Patent No.: US 10,295,065 B2
(45) Date of Patent: May 21, 2019

(54) METHOD FOR DESIGNING A VALVE AND METHOD FOR PRODUCING A VALVE

(71) Applicant: SAFRAN AIRCRAFT ENGINES, Paris (FR)

(72) Inventors: Serge Daniel Le Gonidec, Vernon (FR); Valentin Hue, Vernon (FR); Anthony Caron, Rouen (FR); William Barre, Louviers (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/027,188

(22) PCT Filed: Oct. 6, 2014

(86) PCT No.: PCT/FR2014/052530
§ 371 (c)(1),
(2) Date: Apr. 4, 2016

(87) PCT Pub. No.: WO2015/052423
PCT Pub. Date: Apr. 16, 2015

(65) Prior Publication Data
US 2016/0238141 A1    Aug. 18, 2016

(30) Foreign Application Priority Data
Oct. 9, 2013   (FR) ..................................... 13 59794

(51) Int. Cl.
*F16K 3/26*   (2006.01)
*F16K 3/34*   (2006.01)
(Continued)

(52) U.S. Cl.
CPC ................ *F16K 3/265* (2013.01); *F02K 9/58* (2013.01); *F16K 3/34* (2013.01); *F16K 31/54* (2013.01)

(58) Field of Classification Search
CPC . F16K 3/265; F16K 31/54; F16K 3/54; F16K 3/34; F02K 9/58
(Continued)

(56) References Cited

U.S. PATENT DOCUMENTS 6,135,414 A    10/2000  Mohtar
6,276,458 B1 *  8/2001  Malone ................... E21B 21/10
166/240
(Continued)

FOREIGN PATENT DOCUMENTS

WO    2007/118666 A1    10/2007

OTHER PUBLICATIONS

International Search Report dated Jan. 8, 2015 in PCT/FR2014/052530 Filed Oct. 6, 2014.

*Primary Examiner* — Marina A Tietjen
(74) *Attorney, Agent, or Firm* — Oblon, McClelland, Maier & Neustadt, L.L.P.

(57) ABSTRACT

A method of designing a valve presenting an orifice of section that depends on the position of the valve member of the valve, which section can thus be controlled. The method includes determining a desired variation relationship for the flow section of the valve, which relationship defines a desired variation in the section as a function of time; setting a predetermined movement relationship for the valve member; and defining the shape of the fluid flow orifice in such a manner that, at each instant, if the valve member moves in compliance with the predetermined movement relationship, the flow section remains equal to the desired section. The method makes it possible to design a valve that is simple to control.

18 Claims, 2 Drawing Sheets

(51) Int. Cl.
*F16K 31/54* (2006.01)
*F02K 9/58* (2006.01)

(58) Field of Classification Search
USPC .......................................................... 251/205
See application file for complete search history.

(56) References Cited

U.S. PATENT DOCUMENTS

| | | | |
|---|---|---|---|
| 7,111,643 B2 * | 9/2006 | Oh ........................ | F16K 5/0605 |
| | | | 137/625.41 |
| 2008/0054208 A1 | 3/2008 | Groves | |
| 2009/0224190 A1 * | 9/2009 | Dale ........................ | F02B 37/18 |
| | | | 251/129.06 |
| 2009/0302259 A1 | 12/2009 | Braga | |
| 2011/0146814 A1 | 6/2011 | Groves, II | |
| 2012/0085951 A1 | 4/2012 | Ludwig | |

* cited by examiner

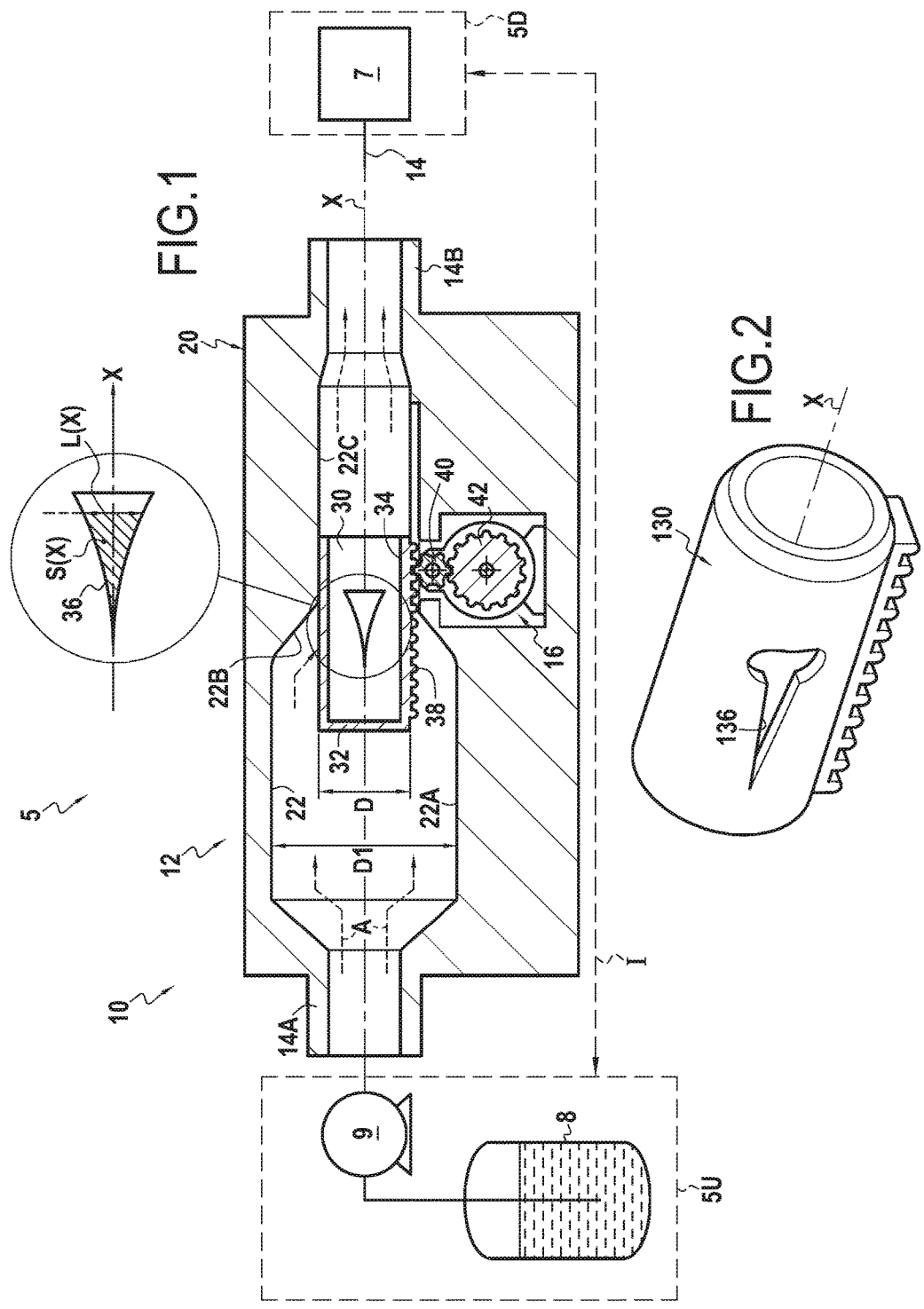

METHOD FOR DESIGNING A VALVE AND METHOD FOR PRODUCING A VALVE

The present invention relates to a method of designing a controllable valve that is applicable to a valve presenting a fluid flow passage of variable section such that a command applied to the valve makes it possible to control the flow rate of said fluid through a valve member. More precisely, the command applied to the valve makes it possible to control the area of the flow section through the valve, referred to herein more simply as the "flow section".

The term "valve member" is used broadly herein to cover any mechanical member or set of mechanical parts capable of moving to modify the flow section of the valve, i.e. capable of moving so as to facilitate, or on the contrary so as to impede, the flow of fluid in the pipe in which the valve is arranged. The valve member may thus be in the form of a flap, a slide, a plug, etc.

When designing a system in which fluid flows, it is usually desired, wherever possible, to make use of components, and in particular mechanical components, that are standard, since they are generally less expensive.

Such a system thus usually incorporates valves that are relatively standard.

Furthermore, when designing the system, the behavior that the system is to have under various expected circumstances is known, or possibly determined, in advance.

Under such circumstances, it is common practice to define the response relationships desired for the various active components making up the system (actuators, regulator means such as valves, motors, pumps, etc.) and having actions that govern the way the system varies. In particular, response relationships are thus defined that, under the expected circumstances, define the variation as a function of time that is desired for the values of actions that are applied to or performed by the components under consideration, and that need to be applied to the system so that it presents the desired behavior.

By way of example, if the system under investigation includes a controllable valve, it is appropriate to define the response relationship that is desired for the valve under various circumstances. The response relationship of such a valve is a function giving flow section values for the orifice of the valve as a function of time.

In order to ensure that a valve delivers a desired response (i.e. the flow section of the valve varies so as to take on in succession the various desired values), it is common practice to provide control means, generally including an electronic control unit constituted by an electronic card or a computer, and the control relationship the valve is determined so that when the valve control relationship is applied thereto by the control unit, the flow section follows the desired response relationship.

Such a design method presents the drawback of making it necessary to control the various active components of the system by using control means that are relatively complex.

Specifically, it can be necessary for control to present a degree of complexity because the movement relationship of the valve member might itself be complex, given a conventional standard profile that may for example be of linear type or of logarithmic type; furthermore, in certain circumstances, it can be necessary to control the position of the valve member with great accuracy, and/or with high acceleration, and/or with high levels of torque or force, where all of these various circumstances lead to an increase in the cost and the complexity of control means, and more particularly of position servo-control.

This leads to the total cost of the system not being optimized.

An object of the present invention is to remedy the above-mentioned drawbacks.

An object of the present invention is to define a design method for designing a valve that presents a fluid flow orifice of variable section (S), said section depending on the position of a valve member, and in which the position of said valve member is controlled by applying a simple command to the valve. The term "flow orifice" in the above definition covers the situations both where the valve presents a single fluid flow opening and where it presents a plurality of openings for passing a flow of fluid.

An object of the present invention is for the valve design method to make it possible to obtain a valve that, under certain predetermined circumstances, presents a relationship for variation in its flow section that is equal to a predetermined variation relationship, even though its valve member moves following a predetermined movement relationship, in particular a movement relationship that is particularly simple to implement, e.g. moving the valve member at a speed that is constant.

To achieve these objects, the valve design method of the invention comprises the following steps:

a) determining, generally by computer calculation, a desired variation relationship ($S^*(t)$) for the flow section of the valve, defining desired variation in the flow section (S) of the valve as a function of time, at least over a time interval ($\Delta t$);

b) setting a predetermined movement relationship ($P(t)$) that the valve member is desired to follow during said interval; and c) defining the shape of said fluid flow orifice in such a manner that, at each instant (t) during said time interval, if the valve member moves during said interval in compliance with said predetermined movement relationship, the flow section ($S(t)$) remains equal to the section ($S^*(t)$) desired for that instant.

Step a) of determining the desired variation relationship (t) for the flow section of the valve is preferably performed by a mathematical optimization method based on a physical simulation model, e.g. using a time solver.

Step c) may in particular be performed by computer.

The variation relationship $S^*(t)$ is preferably selected in such a manner that, in the system of which the valve forms a part, the variation relationship $S^*(t)$ is a relationship that is desired for variations in the section of the valve, at least in one mode of operation of the system.

The movement relationship may be a linear function (of the type $X=at+b$, where a and b are constants, t represents time, and X is position (axial or angular position in particular)).

It may also be a function other than a linear function as defined above.

In order to define the shape of the fluid flow orifice, it is possible by way of example to determine the area of the flow section of the valve in the corresponding position of the valve member at an initial instant of the time interval under consideration; thereafter, the time parameter can be varied progressively over the interval under consideration with the various corresponding flow sections of the valve being determined in succession for the various positions adopted by the valve member during this time interval in such a manner that at each instant the flow section of the valve remains equal to the desired section.

By means of the present invention, the control valve is designed, during the system design stage, so that the movement of the valve member follows a predetermined control relationship. Thus, the movement relationship may be selected to be sufficiently simple, thereby enabling the complexity of the control means of the valve to be reduced. For example, the movement relationship may be a relationship for movement at constant speed.

Implementing the method leads to making valves presenting a fluid flow orifice that is atypical, i.e. not standard. Thus, the shape of the fluid flow orifice (i.e. the shape of the edge or the outlet of the orifice) need not be a conventional geometrical shape nor need it be the combination of a plurality of conventional geometrical shapes, where "conventional geometrical shapes" comprise a circle, an ellipse, a straight line, or a parabola. Conventional geometrical shapes in the above meaning thus include in particular polygonal shapes. Such conventional shapes are generally used whenever the flow section needs to vary in a manner that is linear or parabolic.

In particular, the shape of the fluid flow orifice (i.e. the shape of the edge or the outline of the orifice) need not be a conventional geometrical shape nor need it be the combination of at most ten portions of conventional geometrical shapes, where a conventional geometrical shape is a circle, an ellipse, a straight line, or a parabola.

The variation relationship desired for the flow section of the valve may be obtained in particular by calculation, and this can be done in various ways.

In one implementation, a desired variation relationship ($F^*(t)$) is set for a parameter of a system of which the valve forms a part; then the desired variation relationship ($S^*(t)$) for the section of the valve is determined as a function of the desired variation relationship ($F^*(t)$) for the parameter.

In another implementation, in order to determine the variation relationship desired for the section of the valve, the desired variation relationship ($S^*(t)$) for the section of the valve and a desired variation relationship ($F^*(t)$) for a parameter of a system of which the valve forms a part are determined jointly by calculation.

This calculation generally comprises simulating the operation of the system.

The desired variation relationship $S^*$ for the section of the valve is then determined as being a variation relationship (or the optimum variation relationship) that enables the system to present the desired functioning or behavior.

Where necessary, this calculation takes account of interactions between the portions of the system situated upstream and the portions of the system situated downstream relative to the valve: these interactions may possibly affect the pressure and/or the flow rate in the pipe in which the valve is incorporated.

The system parameter for which the desired variation relationship is set may in particular be the flow rate of the valve, i.e. the flow rate in the pipe in which the valve is placed.

This parameter may more generally be any parameter of the system, providing the section of the valve has an influence on that parameter.

The invention naturally extends to a method of fabricating a valve and including a step of designing a valve by the above-defined valve design method, followed by a step of fabricating the valve as designed in this way.

The invention also proposes a valve device comprising:
a valve presenting a fluid flow orifice of variable section (S), said section depending on the position of a valve member of the valve; and
an actuator suitable for controlling the position of said valve member;

the valve device being characterized in that:
the actuator is suitable for driving the valve member at constant speed over a time interval;
the section of the flow orifice varies in non-linear manner when the actuator drives said valve member at constant speed over said time interval; and
the shape of the fluid flow orifice is not a conventional geometrical shape nor is it the combination of portions of conventional geometrical shapes, where a conventional geometrical shape is a circle, an ellipse, a straight line, or a parabola.

The shape of the fluid flow orifice is specifically the shape of its edge, or its outline.

BRIEF DESCRIPTION OF THE DRAWINGS

The invention can be well understood and its advantages appear better on reading the following detailed description of two embodiments given as non-limiting examples. The description refers to the accompanying drawings, in which:

FIG. 1 is a diagrammatic view in axial section of a valve device of the invention;

FIG. 2 is a diagrammatic perspective view of the valve member of a valve device in an embodiment of the invention.

DETAILED DESCRIPTION OF AN IMPLEMENTATION OF THE INVENTION

Figure 3A:
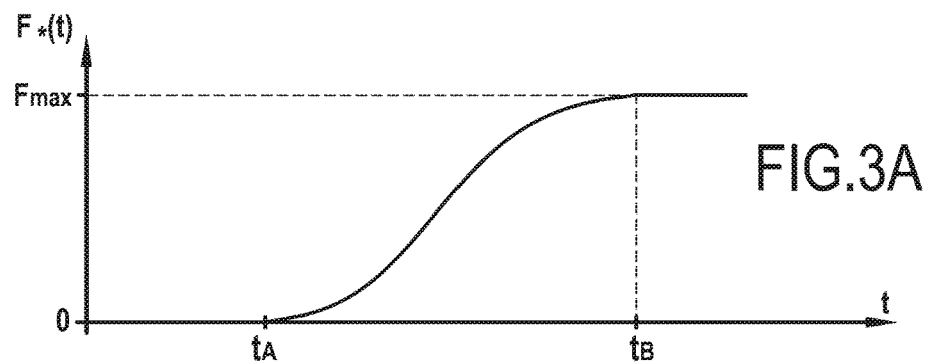
FIGS. 3A, 3B, and 3C are respective curves showing a desired relationship for flow rate variation, a desired response relationship for the flow section, and a travel relationship for the actuator in a valve device of the invention.

An example of a valve device obtained by the method of the invention and an example implementation of the method of the invention are described below in the context of designing a system 5 constituted by a rocket engine 7 and means for feeding it with fuel. These means comprise a liquid fuel tank 8 from which a pump 9 sucks out fuel in order to deliver it into a feed pipe 14 connected to a feed orifice of the engine.

A valve device 10 for regulating the feed to the engine is arranged on the pipe 14.

The device comprises a valve 12 that is a regulator valve serving to regulate the feed of fuel to the engine 7.

The valve 12 is thus inserted in a fluid circuit comprising fluid feed means upstream (tank 8 and pump 9) presenting a certain amount of impedance, and the engine 7 downstream, likewise presenting a certain amount of impedance (relative to the flow of fluid). The upstream feed means and the downstream engine 7 are coupled together not only by the fluid circuit but also by other connections (mechanical, fluid flow, etc.) that are not shown.

The valve device 10 of the invention is shown in FIG. 1.

The device comprises the valve 12 and an actuator 16 specifically constituted by an electric motor that serves to actuate the valve.

The valve 12 is constituted mainly by a valve body 20 interposed between two portions 14A and 14B of the pipe 14, and by a valve member 30 contained in the valve body 20.

The valve body 20 is generally in the form of a rectangular parallelepiped having a bore 22 formed therein for interconnecting the pipe portions 14A and 14B. The bore 22 extends along the axis X of the pipe 14.

This bore presents a specific configuration: at an upstream end (to the left in FIG. 1) it includes an upstream portion 22A of enlarged diameter D1, and at its downstream end it includes a downstream portion 22C of diameter D, the diameter of the downstream portion being substantially equal to the outside diameter of the valve member 20. Sufficient clearance is provided to enable the valve member 20 to slide inside the downstream portion 22C of the bore 22.

The two bore portions 22A and 22C are connected together by a bore portion 22B of substantially frustoconical shape that enables the diameter of the bore 22 to pass continuously from the value D1 to the value D.

The valve member 30 is generally in the form of a cylindrical tube of circular section with an outside diameter D, and it is closed at one of its ends by a wall 32.

In addition, it includes two opposite openings 36 in its cylindrical wall 34 that are of a shape that is generally triangular (but not exactly triangular), enabling fluid to flow from the outside towards the inside of the valve member.

Furthermore, fluting is provided on the outer surface area of the cylindrical wall 34 of the valve member 30, which fluting extends perpendicularly to the axis X so as to form a rack 38. The rack 38 is designed to mesh with the teeth of a toothed wheel 40. The toothed wheel is itself driven in rotation by a toothed wheel 42 that constitutes the outlet member connected to the drive shaft of the motor 16.

Thus, when the motor 16 operates and turns the wheel 42, and consequently the wheel 40, that drives the valve member 30 in movement along the axis X. As the actuator of the valve member 30, the motor 16 thus controls the position of the valve member 30 along the axis X.

The valve 12 serves to regulate the flow rate of fluid flowing in the pipe 14 as follows.

When the fluid coming from the upstream portion 14A of the pipe 14 penetrates into the valve body 20 via the upstream portion 22A of the bore 22 (arrows A), it can reach the downstream portion 14B of the pipe 14 only by flowing through the openings 36 in the valve member 30.

Consequently, the openings 36 constitute the fluid flow orifice of the valve 12, and the total area of the various openings 36 (there being two of them in this example) constitutes the flow section of the valve 12, providing that section is not closed by the wall of the downstream portion 22C of the bore 22.

It should be observed that the design of the valve 12 optionally enables the device 10 to be used with fluid flowing in the direction opposite to that described above (the fluid could enter via the portion 14B, pass through the cylindrical portion 34 of the valve member 30, and then through the two openings 36 so as to enable the fluid to leave via the downstream portion 22A of the bore 22 and the pipe portion 14A).

An example of the method of designing the valve of the invention is described below in the context of designing the system 5 with two possible implementations.

When designing the rocket engine 7 and its two feed means, it is naturally appropriate to optimize the various components and to do so while taking account of their various modes of operation, and in particular during a stage of starting the engine.

In particular, attempts are made to regulate the variations in a parameter that is constituted by the flow rate of the fluid feeding the engine 7 via the pipe 14.

When starting the rocket engine, this fluid flow rate is initially zero and it increases up to a flow rate value $F_{max}$ that is the rate at which the engine consumes fuel under steady conditions.

In order to optimize starting of the engine, it is desirable for the fluid flow rate to increase up to the value $F_{max}$ in a manner that is progressive over a time interval between an instant $t_A$ and an instant $t_B$, while following a predetermined desired profile.

In a first implementation of the design method of the invention, the desired variation relationship $F^*(t)$ is initially set for the parameter of the system that it is desired to regulate, i.e. the flow rate, over the time interval $[t_A, t_B]$.

The selected relationship $F^*$ is shown in FIG. 3A.

The fuel feed valve 12 for the engine is then designed. The difficulty then consists in defining the valve in such a manner as to ensure that it is suitable for causing the parameter of the system that it is designed to regulate, i.e. the flow rate of fluid in the pipe, to vary in compliance with the variation relationship $F^*$.

Starting with the desired variation relationship $F^*$, the desired variation relationship $S^*$ is then calculated for the section S of the valve 12.

This calculation makes it possible to define the desired response relationship (t) of the valve 12 that makes it possible, while starting the engine, to go from the flow rate F having a value zero to the value $F_{max}$ while complying with the relationship $F^*(t)$ as the flow section passes from a zero value (valve member 30 closed) at instant $t_A$ up to the value $S_{max}$ at the instant $t_B$.

In order to obtain the function $S^*$, the operation of the entire system 5 under study is simulated, i.e. the upstream portion 5U of the system as situated upstream from the valve (FIG. 1), the downstream portion 5D of the system as situated downstream from the valve, and also, where applicable, the interactions between these two portions of the system (arrow I).

The desired response relationship $S^*$ of the valve 12 is then identified as the or one of the functions enabling the flow rate to vary in compliance with the variation relationship $F^*$, taken as starting data.

In a second implementation of the design method of the invention, the desired flow rate variation relationship $F^*$ in the valve is not set or calculated in advance, i.e. prior to determining the relationship for variation in the flow section of the valve.

On the contrary, in this second implementation, the operation of the system 5 is simulated so as to take account jointly as parameters both of variations in the section (S) of the valve and variations F(t) in the parameter that it is desired to regulate, i.e. specifically the flow rate in this example.

Simulation is then used to identify a mode of operation for the system 5 that is satisfactory (or considered as being desirable). The functions $S^*$ and $F^*$ are then defined as the variation relationships respectively for the flow section of the valve and for the parameter that is to be regulated, i.e. the flow rate, that correspond to this mode of operation of the system.

In order to continue with defining the valve 12, the relationship is then selected for movement of the valve member; amongst other things, this relationship is selected in such a manner as to minimize the constraints (cost, complexity) on the actuator.

Finally, the shape of the openings 36 in the valve member 30 is defined on the basis of the movement relationship P(t) that has been selected for the valve member, and on the basis of the variation relationship desired for the section $S^*(t)$.

To do this, an initial position $P_A$ is set for the valve member 30 (along the axis X) in which the major portion of the valve member is situated inside the bore portion 22C.

A final position $P_B$ is also selected for the valve member 30 in which the major portion of the valve member is situated inside the bore portion 22A.

Figure 3B:
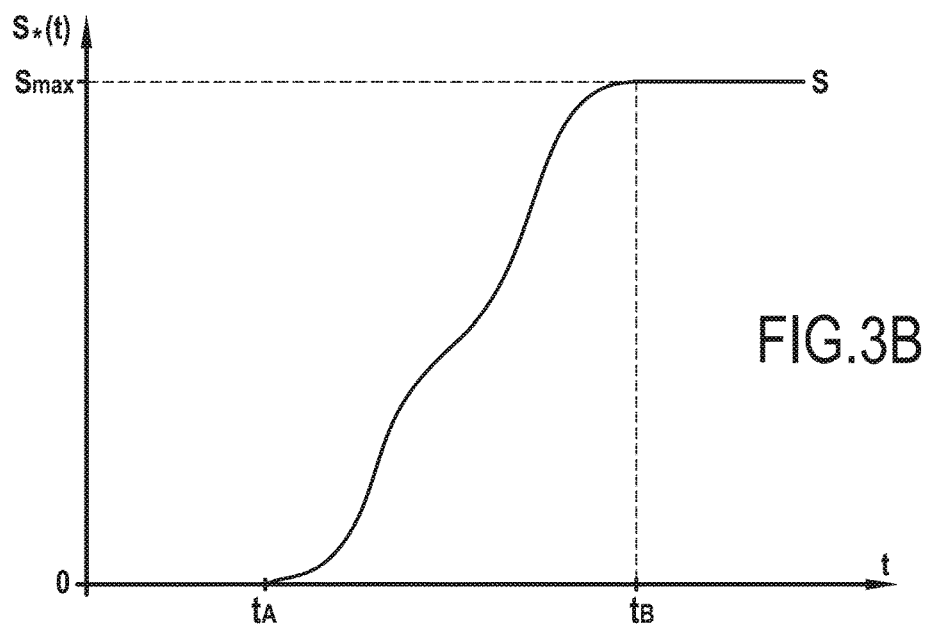
Figure 3C:
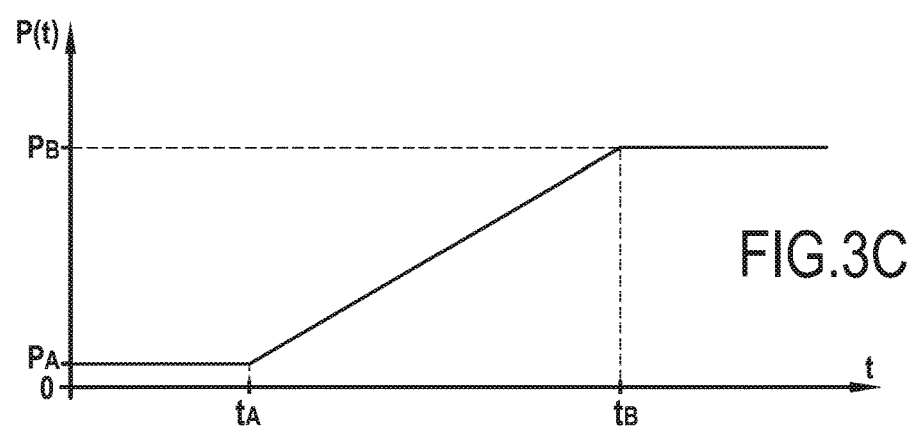

Thereafter, the movement relationship P(t) is given for the valve member 30. In the presently-described example, it is decided to have a movement relationship P(t) that is particularly simple, i.e. a relationship involving movement at constant speed, as shown in FIG. 3. The position P(t) of the valve member varies linearly as a function of time between the initial position (abscissa $P_A$) and the final position (abscissa $P_B$) between instants $t_A$ and $t_B$.

The shape of the openings 36 in the valve member can then be calculated.

To do this, the time variable (t) is eliminated from the equation system:

$$\begin{cases} S = S^*(t) \\ X = P(t) \end{cases}$$

where S is the flow section of the valve (i.e. the total area of the two openings 36), and X is the position of the valve member 30 along the axis X.

The two functions S and X are expressed as a function of time, i.e. respectively $S^*(t)$ and P(t). The values of S and P at given instants under consideration t are associated so as to obtain the relationship S=f(X).

For each of the two openings 36, it is then possible to deduce its width L as a function of its position along the X axis. The surface area S(X) is related to the width L by the relationship:

$$S(X) = \int_{P_A}^{X} L(u)\,du$$

By differentiating this relationship, the following is obtained:

$$L(X) = S'(X)$$

The above calculation thus makes it possible to obtain the profile for the openings 36, as defined in this example by the function L specifying the width of the opening as a function of position along the axis X.

With a function $S^*$ of the kind shown in FIG. 3, the function L is not a linear function (or more precisely not an affine function) of the abscissa X.

Advantageously, because the openings 36 thus have a defined shape, when the valve member 30 moves at constant speed along the axis X, the flow section S of the valve 12 varies in application of the desired response relationship $S^*(t)$, and consequently the flow rate fluctuates in application of the desired variation relationship $F^*(t)$.

Using the method of the invention thus makes it possible to define openings 36 (representative of the flow orifice of the valve 12) and thus to define the valve 12, in which the valve member has a profile that makes it possible to achieve the desired variation in the flow rate (function $F^*$) while enabling the motor 16 that drives the valve member 30 advantageously to be controlled using a function that is particularly simple, i.e. a relationship for movement at constant speed. Consequently, using a valve such as the valve 12 makes it possible to simplify very greatly the means for controlling the motor 16 and thus for controlling the system 5.

FIG. 2 shows an example of another possible profile for the openings 136 in a valve member of the invention, corresponding to a desired response relationship for the valve, which relationship is other than the above-described function $S^*$.

Finally, in the present example, the valve member of the valve 12 moves along an axis and its position is an axial position. The present invention is equally applicable in particular to valves having a valve member that is rotary, having its position defined by an angle.

The invention claimed is:

1. A design method for designing a valve presenting a fluid flow orifice of variable section, said section depending on the position of a valve member of the valve, the position of said valve member being controlled by a command applied to the valve; the method comprising the following steps:
   a) determining a desired variation relationship for the flow section of the valve, defining desired variation in the flow section of the valve as a function of time, at least over a time interval;
   b) setting a predetermined movement relationship that the valve member is desired to follow during said interval; and
   c) defining the shape of said fluid flow orifice in such a manner that, at each instant during said time interval, if the valve member moves during said interval in compliance with said predetermined movement relationship, the flow section remains equal to the section desired for that instant.

2. A design method according to claim 1, wherein said movement relationship is a constant speed movement relationship.

3. A design method according to claim 2, wherein a desired variation relationship is set for a parameter of a system of which the valve forms a part; said desired variation relationship for the section of the valve is determined as a function of said desired variation relationship for the parameter.

4. A method of fabricating a valve, the method including a step of designing a valve using the valve design method according to claim 3, followed by a step of fabricating the valve as designed in this way.

5. A design method according to claim 2, wherein both said desired variation relationship for the section of the valve and a desired variation relationship for a parameter of a system of which the valve forms a part are determined jointly by calculation.

6. A method of fabricating a valve, the method including a step of designing a valve using the valve design method according to claim 5, followed by a step of fabricating the valve as designed in this way.

7. A method of fabricating a valve, the method including a step of designing a valve using the valve design method according to claim 2, followed by a step of fabricating the valve as designed in this way.

8. A design method according to claim 2, wherein no part of the fluid flow orifice is any of a polygon, a circle, an ellipse, a parabola or a straight line.

9. A design method according to claim 1, wherein a desired variation relationship is set for a parameter of a system of which the valve forms a part; said desired variation relationship for the section of the valve is determined as a function of said desired variation relationship for the parameter.

10. A design method according to claim 9, wherein said parameter of the system is a flow rate of said valve.

11. A method of fabricating a valve, the method including a step of designing a valve using the valve design method according to claim 10, followed by a step of fabricating the valve as designed in this way.

12. A method of fabricating a valve, the method including a step of designing a valve using the valve design method according to claim 9, followed by a step of fabricating the valve as designed in this way.

13. A design method according to claim 1, wherein both said desired variation relationship for the section of the valve and a desired variation relationship for a parameter of a system of which the valve forms a part are determined jointly by calculation.

14. A design method according to claim 13, wherein said parameter of the system is a flow rate of said valve.

15. A method of fabricating a valve, the method including a step of designing a valve using the valve design method according to claim 14, followed by a step of fabricating the valve as designed in this way.

16. A method of fabricating a valve, the method including a step of designing a valve using the valve design method according to claim 13, followed by a step of fabricating the valve as designed in this way.

17. A method of fabricating a valve, the method including a step of designing a valve using the valve design method according to claim 1, followed by a step of fabricating the valve as designed in this way.

18. A design method according to claim 1, wherein no part of the fluid flow orifice is any of a polygon, a circle, an ellipse, a parabola or a straight line.

\* \* \* \* \*